United States Patent [19]
Katoh et al.

[11] Patent Number: 5,719,981
[45] Date of Patent: Feb. 17, 1998

[54] OPTO-ELECTRIC DEVICE

[75] Inventors: Ikuo Katoh; Kiyoshi Yokomori, both of Yokohama, Japan

[73] Assignee: Ricoh Company, Ltd., Tokyo, Japan

[21] Appl. No.: 295,429

[22] Filed: Aug. 25, 1994

[30] Foreign Application Priority Data

Aug. 25, 1993 [JP] Japan .................... 5-210012

[51] Int. Cl.⁶ ........................................ G02B 6/10
[52] U.S. Cl. ........................................ 385/129
[58] Field of Search ..................... 385/14, 33, 35, 385/129–131, 3–8; 372/42, 45

[56] References Cited

U.S. PATENT DOCUMENTS

| | | | |
|---|---|---|---|
| 4,693,543 | 9/1987 | Matsumura et al. | 385/14 |
| 4,755,015 | 7/1988 | Uno et al. | 385/14 X |
| 4,881,235 | 11/1989 | Chinone et al. | 372/45 |
| 4,932,743 | 6/1990 | Isobe et al. | 385/33 |
| 5,091,982 | 2/1992 | Yokomori et al. | 385/33 |
| 5,157,746 | 10/1992 | Tobita et al. | 385/33 |

FOREIGN PATENT DOCUMENTS

| | | |
|---|---|---|
| 0 336 421 | 10/1989 | European Pat. Off. . |
| 2 681 146 | 3/1993 | France . |
| 37 04 378 | 11/1987 | Germany . |
| 1144002 | of 0000 | Japan . |

OTHER PUBLICATIONS

Teubner–Texte zur Physik, vol. 27, pp. 220–247, (1993), "Intergrated Optics And Micro–Optics with Polymers" (No Month).

*Primary Examiner*—Akm E. Ullah
*Attorney, Agent, or Firm*—Oblon, Spivak, McClelland, Maier & Neustadt, P.C.

[57] ABSTRACT

An optical integrated circuit for preventing unnecessary optical waves from outside or scattered in a waveguide. The optical integrated circuit has an substrate, a wave guide which has a core layer and at least a clad layer formed on the substrate, in which an optical wave is guided and transmitted, and a cover layer of which material has a high optical wave absorption ratio, which is formed on the waveguide partially or entirely.

7 Claims, 4 Drawing Sheets

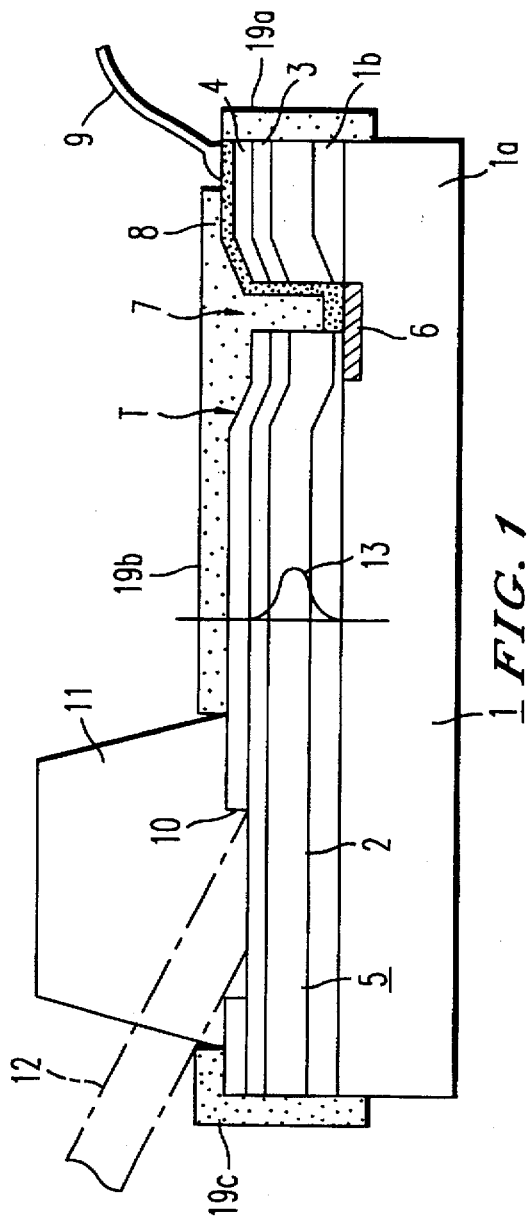
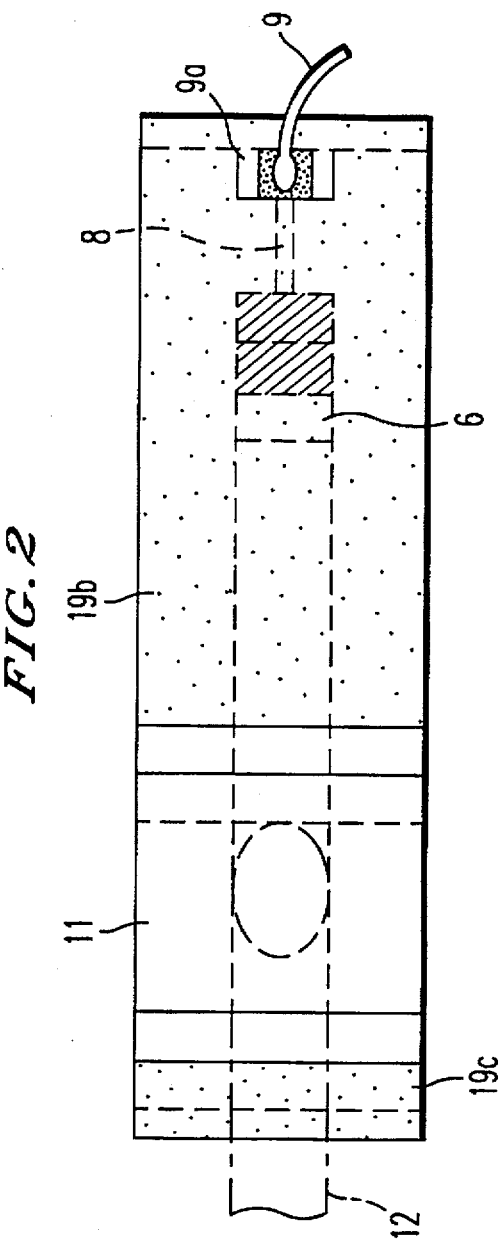

OPTO-ELECTRIC DEVICE

BACKGROUND OF THE INVENTION

1. Field of the Invention

The present invention relates to an opto-electric device. More particularly, the invention relates to an optical integrated circuit which may be used in an optical transmitting instrument, an optical measuring instrument, etc.

2. Discussion of the Background

Conventionally, prism couplings and grating couplings have been used to couple laser light into a waveguide. The laser light approaching from an incident angle above an upper side of the waveguide and is then coupled into the waveguide. The guided optical wave is transmitted, focused by a lens, reflected by a supersonic wave grating, and modulated by an electric-optical device. Afterwards, the optical wave may be emitted back into the coupler or can be detected in a photodetector. The photodetector is usually formed such that its detecting side is facing the upper surface of the waveguide, and the optical wave can be absorbed quite easily by making a lower clad layer thin. As a result, the optical wave can be detected with good sensitivity.

In FIG. 7 a prior art optical integrated circuit is described. In substrate 1, a buffer layer 1b is formed on a Si substrate 1a of a semiconductor. A core layer 2 is formed on substrate 1 and a first clad layer 3 is formed on the core layer 2. A second clad layer 4 is formed on the first clad layer 3. In this case, waveguide 5 is composed of buffer layer 1b, core layer 2, first clad layer 3 and second clad layer 4. The refractive index of core layer 2 is slightly less than that of clad layers 3 and 4 and buffer layer 1b. Slant portion T is formed in the waveguide 5 and PIN photodiode detector 6 is formed under the waveguide adjacent to the slant portion T. An electrode 8 is connected to a contact-hole 7 which is formed above detector 6 and bonded to wire 9. An opening 10 is formed in second clad layer 4 and a prism 11 is located on the opening.

In this device, a laser beam 12 enters prism 11 from the upper left side in FIG. 7 and then enters into first clad layer 3 by way of opening 10. Since a high refractive index material is used in prism 11 and a low refractive index material is used in the first clad layer 3, when an evanescent wave of the laser which enters in a condition of total reflection is matched in phase to a waveguide mode, incident beam power shifts into transmitting beam power. Therefore, a guided optical wave 13 is excited and transmitted towards the right hand direction in FIG. 7. In this way, laser beam 12 is coupled through prism 11 into waveguide 5. The distribution of electric field of coupling mode is strong in the first clad layer 3, and it is weak in the second clad layer 4, and the guided optical wave 13 is confined there. Therefore, the inputted laser light does not exit immediately, but rather it is transmitted in waveguide 5. Since the second clad layer 4 is relatively thick and the refractive index of the first clad layer is same as that of the clad layer 4, even if a material having a high optical wave absorption ratio is formed on second clad layer 4, guided optical wave 13 is not decreased. Moreover, buffer layer 1b formed under core layer prevents the optical wave from being absorbed in the Si substrate 1a. As a result, the guided optical wave 13 is transmitted in the waveguide 5 and it can be detected at detector 6 efficiently by means of being guided by slant portion T. After detection an electrical signal from detector 6 is sent to electrode 8 which is outputted through wire 9. Generally, an electrode is also formed under substrate 1 (not shown in FIG. 7) and a potential difference between electrodes is outputted. Finally, an output signal is outputted.

Since photodetector 6 is formed with its detecting surface facing an upper surface of the substrate 1, optical waves entering from the upper-outside face of the substrate are also detected and produce noise optical waves. If an opto-electric device is installed in a shaded container, of course, the noise optical waves can be reduced. However, as a laser beam must typically be inputted from outside, such a device cannot be installed in a completely obscured box. Therefore when high signal-to-noise ratio is necessary, the device described above is inadequate. Although an optically integrated circuit in which outside extraneous optical waves cannot enter detector 6 is desired, no such device was currently available until now.

Moreover, in the above-identified prior art device guided optical wave 13 which is transmitted in waveguide 5 is scattered by the crystalline structure, the refractive index or the thickness of layer, or by an impurity particle. Therefore, scattered optical waves having disordered directions, phases, etc., are generated. Some scattered optical waves are transmitted in core layer 2 and arrive at photodetector 6. As their wavefronts are in disorder, they become flare optical waves which are noise optical waves. Some scattered optical waves are transmitted in the waveguide 5 containing core layer 2, and also arrive at the photodetector 6 and become noise optical waves. Although a structure in which scattered optical waves are absorbed is desired to prevent noise optical waves, such a device had been unavailable until now.

In Japanese laid open patent 01-144002, incorporated herein by reference, another optical integrated circuit is disclosed. This is an optical device in which an optical wave in the TM mode is transmitted in a waveguide. A complex dielectric is used to absorb unnecessary optical waves in the TM mode. FIG. 8 is an example in which this prior art device is applied to an optical integrated head for an optical disk. A waveguide 15 is formed in a substrate 14 which is composed of Si substrate 14a and buffer layer 14b. Complex dielectrics 16a and 16b are formed on waveguide 15. A buffer layer (not shown in FIG. 8) is formed under the dielectric 16a. As a result, unnecessary optical waves in the TM mode from a laser which are generated secondarily are reduced by complex dielectric 16. FIG. 9 is an example in which this prior art device is applied to an optical integrated fluid current meter. A dielectric 16 is formed on waveguide 15 on substrate 14. Non-diffracted TM mode optical wave 18 from a laser is absorbed effectively, and loss of optical performance is reduced.

The complex dielectrics are materials of a complex dielectric constant, and metal or conductive ceramic are disclosed as examples. Then the metal or conductive ceramic is formed on the waveguide. As a result, an unnecessary TM mode optical waves are absorbed in a layer of the metal or conductive ceramic. However, scattered optical waves, which are not TM mode waves, cannot be absorbed. They are reflected on the layer of metal or conductive ceramic, which have high reflectance toward the waveguide. Thus a problem occurs with this device in that scattered optical waves cannot be absorbed effectively.

SUMMARY OF THE INVENTION

It is a first object of the present invention to provide an opto-electric device in which interfering outside waves are prevented from entering, and in which scattered optical waves which are generated in a waveguide are absorbed.

It is another object of the present invention to provide an optical integrated circuit in which production processing costs are low.

These and other objects and advantages are achieved by the present invention which provides an optical integrated circuit comprising a substrate, a waveguide which comprises a core layer and at least one clad layer formed on the substrate, in which an optical wave is guided and transmitted, and a cover layer comprising a material having a high optical wave absorption ratio, which cover layer is formed on the waveguide either partially or entirely.

BRIEF DESCRIPTION OF THE DRAWINGS

In describing preferred embodiments of the present invention illustrated in the drawings, specific terminology is employed for the sake of clarity. However, the invention is not intended to be limited to the specific embodiments or terminology so selected, and it is to be understood that each specific element includes all technical equivalents which operate in a similar manner.

A more complete appreciation of the invention and many of the attendant advantages thereof will be readily obtained as the same becomes better understood by reference to the following detailed description when considered in connection with the accompanying drawings, wherein:

FIG. 1 is a section view of a first opto-electric device of the present invention;

FIG. 2 is a plane view of a first opto-electric device of the present invention;

DETAILED DESCRIPTION OF THE PREFERRED EMBODIMENT

Referring now to the Figures, certain preferred embodiments of the present invention will be described.

Figure 3:
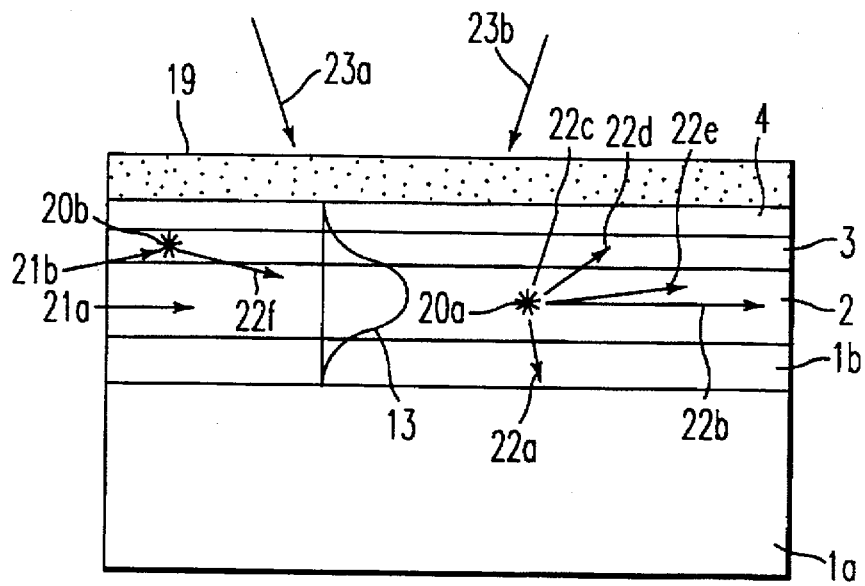
FIG. 3 is a section view showing the movement of an optical wave in the present invention.
Figure 7:
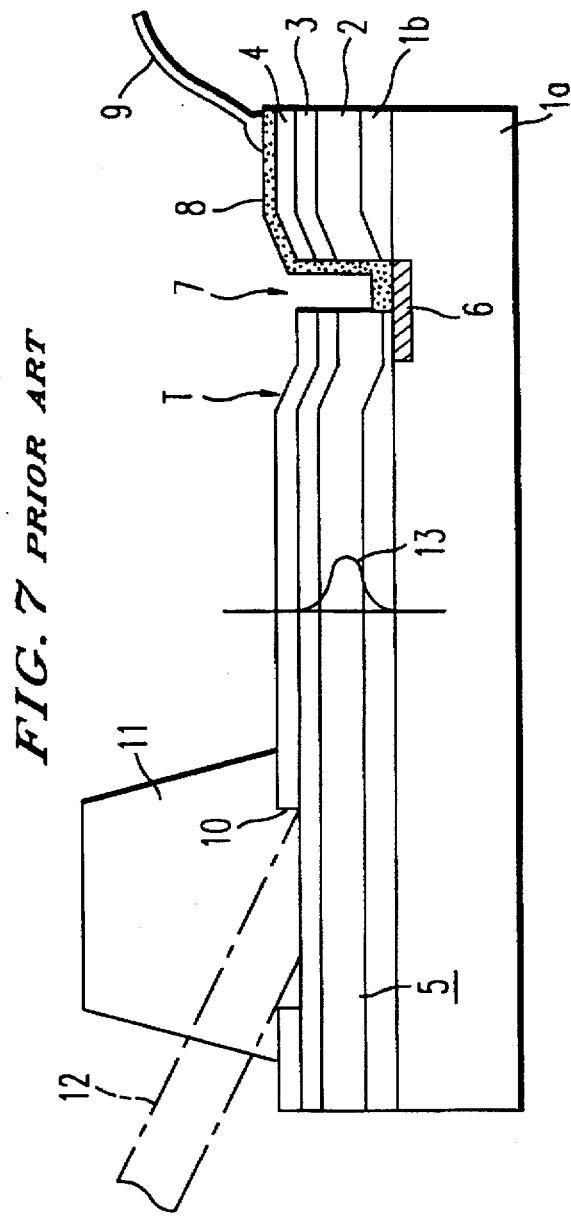
FIG. 7 is a section view of an optical integrated circuit of a first prior art device.
Figure 8:
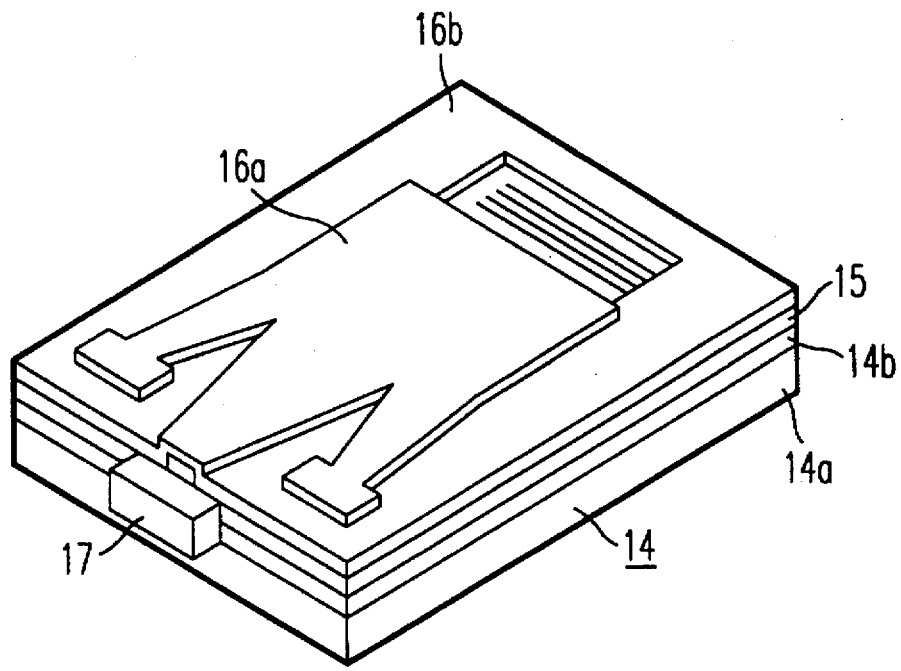
FIG. 8 is a schematic diagram of a second prior art device.
Figure 9:
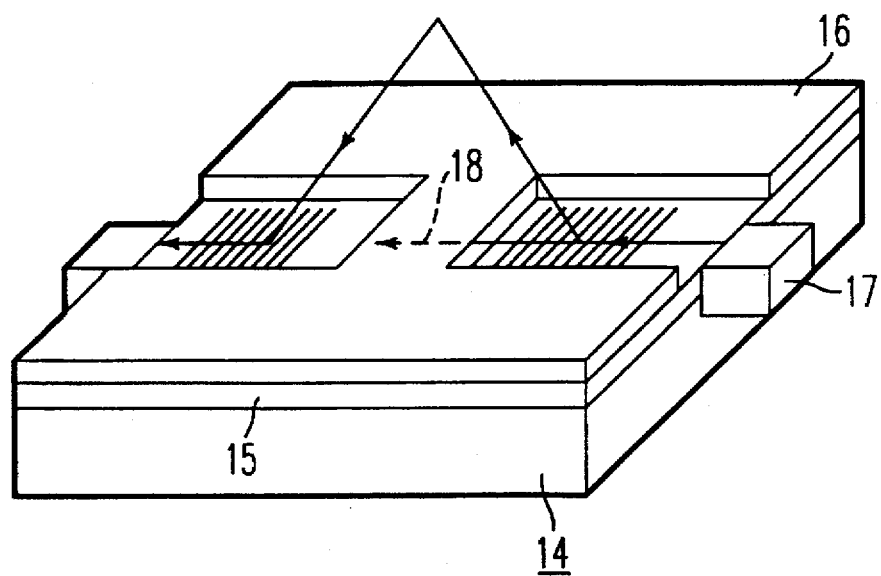
FIG. 9 is a schematic diagram of a second prior art device.

Referring to FIGS. 1–3, a first embodiment will be described. The description of the same parts in FIGS. 1–3 that appear in the prior art (referring to FIG. 7) will be curtailed or omitted, and the same numbers will be used to describe the same parts.

FIG. 1 is a section view of an optical integrated circuit of the present invention and FIG. 2 is its plane view. A core layer 2 is formed on a substrate 1 which substrate comprises Si substrate 1a and buffer layer 1b. A first clad layer 3 and a second clad layer 4 are formed on core layer 2. The refractive index of the core layer 2 is slightly less than the refractive indices of the first clad layer 3, the second clad layer 4, and the buffer layer 1b. Generally, the refractive index of layer 2 is, independently, 15%, 10%, 5%, 3%, 1.0%, 0.5% or 0.3% less than the refractive indices of layers 3, 4 and 1b. Other percentage differences can be used.

Cover layer 19 (19a, 19b, 19c) made of a material having a high optical wave absorption ratio and containing a high molecular weight compound as a main component is formed on the second clad layer 4, in a contact-hole 7, and on both end sides of substrate 1. The high molecular weight compound is preferably PMMA (polymethyl methacrylate) optionally containing an azo dye. If the optical wave absorption ratio of this high molecular weight compound is high, problems are avoided. Even if not, the optical wave absorption ratio can be increased by adding a dye. Moreover, since the high molecular weight compound used has a low conductivity, it can contact electrode 8. Therefore cover layer 19, which is high molecular weight compound of low conductivity, is filled up within contact-hole 7 on detector 6 which is wired with electrode 8.

A thermoplastic high molecular weight compound is preferably used as cover layer 19 and this material can cover easily by heating. Bonding portion 9a which is connected with wire 9 is formed in the electrode 8 and prism 11 adheres to the waveguide 5 at portions which do not have cover layer 19 formed on waveguide 5. These portions can be formed easily by screen printing and the like. Even after the prism 11 is adhered to waveguide 5, these non-covered portions can be formed by such techniques. Accordingly, the production process costs are low.

The high molecular weight compound of cover layer 19, when a thermoplastic material, forms easily even when thickness of the layer 19 becomes thick. Typical weight average molecular weights of the high molecular weight compound (thermoplastic or thermohardening) range from 800 to 1,000,000, preferably 2,000 to 100,00. The thickness of the cover layer preferably varies from 0.1 to 10 mm, more preferably 0.5, 1, 1.5 or 2 mm. Other thicknesses can be used.

Layer 19 also functions as a protective layer. Moreover, when a metal layer (not shown in FIG. 1) is formed on cover layer 19 as a uppermost layer, the cover layer 19 can be used as an intermediate layer of low conductivity. The cover layer 19 may be made by adding a dye to the high molecular weight compound.

Next, the operation of a present invention embodiment will be described. The inventors are not bound by a particular theory, however, FIG. 3 is a schematic figure showing scattered optical waves which are generated in the waveguide 5. An impurity particle 20a which causes scattering is in core layer 2, and an impurity particle 20b is also in the first clad layer 3. Disturbing optical waves 21a and 21b are incident from an end side of waveguide 5. The impurity particle 20a generates scattered optical waves 22a, 22b, 22c, 22d, and 22e from disturbing optical wave 21a. The impurity particle 20b generates a scattered optical wave 22f from the disturbing optical wave 21b. The disturbing optical waves 23a, 23b are incident from above cover layer 19.

Disturbing optical wave 21a emanating from the end of the waveguide is transmitted in core layer 2. Some of optical wave 21a collides with impurity particle 20a and several scattered optical waves are generated. Much of the scattered optical wave 22a which is scattered toward the lower direction at the impurity particle 20a, incidents upon Si substrate 1a and is absorbed there. Some of optical wave 22a reflects toward the upper direction again. Much of the scattered optical wave 22c, which is scattered toward the upper surface direction, incidents upon cover layer 19 and is absorbed there. Some of the optical wave 22c reflects towards the lower direction again. In this way, reflection and absorption are repeated many times in the Si substrate 1a and the cover layer 19. Therefore the scattered optical waves 22a and 22c are greatly decreased.

The inclined angle of the reflection of the scattered optical wave 22d is less than that of scattered optical wave 22c. Since the reflection ratio at first layer 3, second clad layer 4 and cover layer 19 is greater, the optical wave absorption ratio is decreased. However, as reflection and absorption is repeated many times scattered optical wave 22d is decreased gradually as in wave 22c. The inclined angle of reflection of scattered optical wave 22e is slight. If core layer 2 is multi-mode, optical wave 22e is transmitted in the layer. Furthermore, scattered optical wave 22d of which the moving direction does not change is transmitted without decreasing. Those scattered optical waves which are transmitted without absorption would be detected on detector 6 and become noise optical wave waves. However, when the cover layer 19 is formed within contact-hole 7, those transmitted optical waves are absorbed. Moreover, and for further benefit, it is advantageous that cover layers 19a and 19b be formed on the ends of the waveguide.

On the other hand, much of disturbing optical wave 21b which enters at some angle from the end side of the waveguide is absorbed before it arrives at detector 6. Some of the optical wave 21b collides with the impurity particle 20b and a scattered optical wave 22f is generated. If the reflection angle of this scattered optical wave 22f is an optical wave, the absorption ratio is decreased and optical wave 22f becomes guided optical wave 13. However, as the cover layer 19 is also formed within contact-hole 7, such optical waves can also be absorbed. Moreover, it is also advantageous that cover layers 19a and 19b be formed on the ends of the waveguide. In addition, the disturbing optical waves 23a and 23b which enter from above cover layer 19 can be absorbed easily in cover layer 19.

As described above, cover layer 19, which is made, e.g., from a high molecular weight compound like PMMA containing an azo dye, prevents disturbing optical waves from entering waveguide 5 and prevents scattered optical waves from arriving at the detector 6. Moreover, since a thermoplastic resin is used as the cover layer material, the production costs are low.

Next, a second embodiment will be described. The description of the same parts appearing in the first embodiment will be omitted and the same numbers will be used to refer to the same parts. In this embodiment, a cover layer material 19 having substantially the same refractive index as the refractive indices of the clad layers is used in the optical integrated circuit described above in the first embodiment (referring to FIG. 1). Specific examples will be described hereinafter.

The refractive index of the high molecular weight compound used in cover layer 19 can be changed between 1.34 and 1.70 easily by changing the layer dopant or identity of the high molecular weight material. Moreover, a high molecular weight compound having a high refractive index can be compounded with other materials and its refractive index can be adjusted as well as optical glass. In this way, the refractive index of the cover layer 19 can be almost same as that of the first clad layer 3 and the second clad layer 4.

When the refractive index of the cover layer 19 is substantially the same as that of the first clad layer 3 and the second clad layer 4, the scattered optical waves which arrive at the boundary between the cover layer 19 and second clad layer 4 do not reflect at the boundary and enter into the cover layer. Since the absorption ratio of the cover layer 19 is high, all scattered optical waves can be absorbed. That is, the cover layer 19 functions as a third clad layer. As the thicknesses of the first clad 3 and the second clad layer 4 are thick enough for guided optical wave 13 to be confined, a transmitting loss of guided optical wave 13 in the core layer 2 is not affected and the transmitting loss of the scattered optical waves (except the guided optical wave 13) is very high.

In this case, even if the refractive index of the cover layer 19 is not exactly the same as those of the first and the second clad layers 3, 4 but is almost the same as those of the first and the second clad layers 3, 4, the reflectance from the clad layer to the cover layer is low (by Fresnel coefficient). Therefore the scattered optical waves are absorbed. Moreover, it is possible that the refractive index of the entire cover layer 19 is not same as that of the clad layer, and the refractive index of cover layer 19 near the second clad layer 4 is same as that of the clad layer 4 with the refractive index in the cover layer 19 changing gradually in gradient fashion. Moreover, when the refractive index in one layer cannot be changed, a structure of multi-layers which have different refractive indexes is possible.

Typical exemplary values will now be described. First, the case where the refractance of the optical wave which is scattered in the vertical direction of the waveguide 5 is considered. The first clad layer 3 and the second clad layer 4 may be made from $SiO_2$ of OCD and their refractive index is 1.47. Two cases wherein the high molecular weight compound of the cover layer are PMMA (of which the refractive index is 1.49) and polycarbonate (of which the refractive index is 1.58), will be considered. The reflectance is 0.676% in the case of PMMA, on the other hand the reflectance is 3.61% in the case of polycarbonate. Therefore the latter is five times higher than the former. As a result, it is advantageous that the refractive index of the high molecular weight compound of cover layer 19 is almost the same as that of the clad layer.

On the contrary, if the difference in refractive index between the cover layer 19 and the clad layer is large, the reflectance at the boundary between the cover layer 19 and the clad layer is high and the scattered optical waves which are totally reflected are increased and are confined within the clad layer by the cover layer 19.

As described above, the refractive index of the high molecular weight compound of the cover layer 19 is almost same as that of the clad layer. As a result, the reflection of the scattered optical waves at the boundary between the cover layer 19 and the clad layer can be lowered, and the scattered optical waves can be absorbed more effectively in the cover layer 19.

Next, a third embodiment will be described. A description of the same parts described above for the first and second embodiments will be omitted and the same numbers will be used to refer to the same parts.

In this embodiment, minute particles which have a high optical wave absorption ratio are contained in the high molecular weight compound of cover layer 19 in the optical integrated circuit in the first embodiment (referring to FIG. 1). Specific examples will be described hereinafter.

Figure 4A:
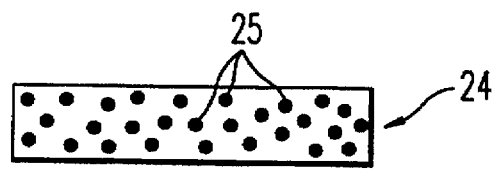
FIG. 4(a) is a schematic view showing the structure of a high molecular compound of a third embodiment of the present invention.

FIG. 4(a) shows cover layer 19 made from PMMA 24 (the high molecular weight compound) of 1 mm thickness. In FIG. 4a, minute particles of carbon black 25 are contained therein which provide high optical wave absorption ratio in the PMMA 24. This carbon black 25 is 2 μm in average size. 0.5–4 μm particles can be used. When such minute particles 25 of carbon black are contained in transparent PMMA 24 they are separated as particles in PMMA 24, and the cover layer 19 has a high optical wave absorption ratio and durability. In this case, as each surface of the carbon black is covered with moleculars of PMMA 24, they do not contact the second clad layer 4 directly. Therefore, the refractive index of the boundary of the cover layer is almost same as that of PMMA. As a result, the optical wave absorption ratio of the cover layer 19 can be high without changing the characteristics of the PMMA. This is very different from the case where the particles 25 of the carbon black cover the clad layer directly. Moreover, the carbon black has a high optical wave absorption ratio and is used as a coloring agent in toners used in electrophotographic image forming apparatuses.

Figure 4B:
FIG. 4(b) is a schematic view showing the structure of a high molecular compound of another embodiments of the present invention.

FIG. 4(b) shows the covering layer 19 compounded with an organic dye, providing a uniform cover layer having a high optical wave absorption ratio. However, when the thickness of this cover layer 19 is to thin, the organic dye may not absorb optical waves. Furthermore, when the amount of the organic dye is increased, wetproofness and chemical-proofness of the layer may be changed, and life expectancy may be shortened. In the structure depicted in FIG. 4(a), the optical wave absorption ratio can be increased without the problems associated with the case of FIG. 4(b).

An organic pigment and an inorganic pigment (except carbon black) can be used as particles in the high molecular weight compound. Moreover, a mixture of both pigments can be used. Furthermore, not only solid particles but also minute liquid bubbles which have a high optical wave absorption ratio can be used. In addition, carbon black and inorganic and organic pigments can be contained in advance in the high molecular compound which is made by reacting as a glue because they are hardly affected to chemical reaction of the glue.

Next, a forth embodiment will be described. A description of the same parts of the first—the third embodiments will be omitted and the same numbers will be used to describe the same parts.

Figure 5:
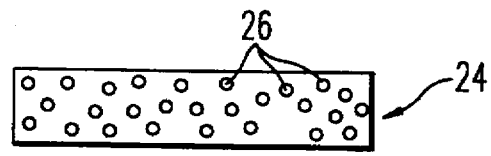
FIG. 5 is a schematic view showing the structure of a high molecular compound of a forth embodiment of the present invention.
Figure 6:
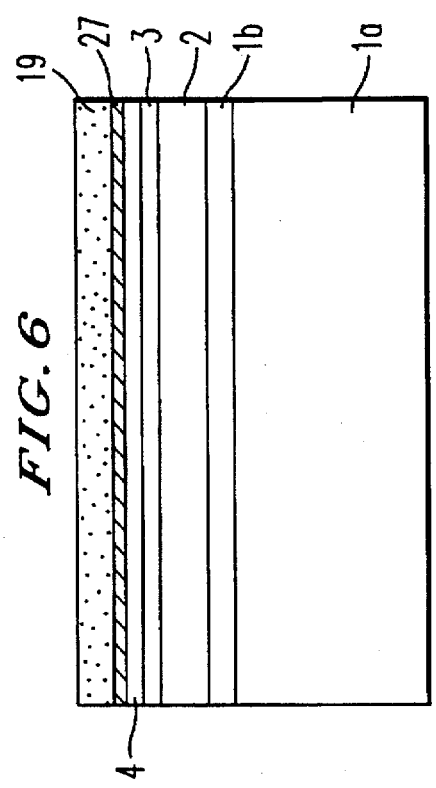
FIG. 6 is a section view of an opto-electric device circuit of a fifth embodiment of the present invention.

In this embodiment, micro structures which function to cause scattering are formed in the high molecular weight compound of the cover layer 19 in the optical integrated circuit in the first embodiment (referring to FIG. 1). Specific examples will be described hereinafter. FIG. 5 shows that many hollow void micro structures 26 are formed in PMMA 24. In this case, the refractive index of the hollow voids is near 1 and that of the PMMA 24 is 1.49, the difference of the refractive index is large. Therefore the optical wave in the cover layer 19 is scattered. Preferred void size is the same as the carbon black described above. Other size voids can be used.

As described above, as the PMMA does not contain additions and is transparent, its optical wave absorption ratio is low. However, the optical wave absorption ratio of the cover layer 19 can be made higher by the scattering of the hollow voids. Moreover, as the PMMA does not contain additives and hardly changes the chemical characteristic, it is stable against chemicals. Furthermore it is advantageous that an unevenness be formed on the surface of the PMMA with the micro-structures. Since the optical waves entering from outside are not prevented completely by forming the hollow voids 26, it is advantageous that the hollow voids are formed in PMMA which is mixed with a dye and/or minute particles and/or in one layer of the multi-layers.

Next, a fifth embodiment will be described. A description of the same parts of the first—the forth embodiments will be omitted and the same numbers will be used to describe about the same parts. In this embodiment, a glue layer 27 is formed between the cover layer 19 and the second clad layer 4.

Generally, as described above, when a thermoplastic resin is used as the high molecular weight compound, the layer of resin can be formed easily on the surface of the second clad layer 4 by heating. Moreover, when a soluble resin in a solvent is used as the high molecular compound, the layer of the resin can also be formed easily by volatilizing the solvent after applying it. In addition, the high molecular weight compound can be made by mixing the dye or the pigment in glue. Production costs are low.

On the other hand, when a thermohardening resin is used as the high molecular compound, the methods used with the thermoplastic resin cannot be easily used. In addition, as the area for adhering the prism 11 and the area for bonding the wire 9 on the electrode 8 are necessary on the second clad layer 4, an uncovered area must be formed on it. Moreover, as the material which has the high optical wave absorption ratio is used as the high molecular weight compound, patterning by an optical wave-hardening resin is not effective. The cost of the production process is high.

Therefore, in this embodiment, as the glue layer 27 is formed on the second layer 4 and the covet layer 19 adheres to and is fixed on the glue layer 27, the cover layer of the thermohardening resin can be formed more easily. Moreover, the uncovered area can be formed easily by patterning before the glue layer 19 is formed. In this way, the complication of production processing using the thermohardening material does not occur. The cover layer 19 adheres to and is fixed on the glue layer 27 on the second clad 4 or the glue layer 27 is formed under the cover layer 19 in advance and it adheres to the second clad layer 4 for example when as a glue-tape is used. In this way, the production process can be low cost. In the case of multi-layers, plural glue layers are formed.

As described above, there are the following advantages in our invention. In the first embodiment, when the cover layer is made from one or more high molecular weight compounds of, e.g., PMMA optionally containing an azo dye, disturbing optical waves can be prevented from entering the waveguide and scattered optical waves can be prevented from arriving at the detector. Moreover, when a thermoplastic resin is used as the high weight molecular compound, the production process can be low cost.

In the second embodiment, the refractive index of the high molecular weight compound of the cover layer is almost same as that of the clad layer. As a result, the reflection of the scattered optical waves at the boundary between the cover layer and the clad layer can be lower, and the scattered optical waves can be absorbed in the cover layer more effectively.

In the third embodiment, minute particles which have high optical wave absorption ratio are contained in the high molecular weight compound of the cover layer. As a result, the optical wave absorption ratio of the cover layer can be high without changing the chemical characteristics and the like of the high molecular weight compound.

In the forth embodiment, the high molecular compound of the cover layer has micro-structures which have a scattering function, its optical wave absorption ratio can be high without changing the chemical characteristics and the like of the high molecular weight compound.

In the fifth embodiment, a glue layer is formed on the second layer and the cover layer adheres to and is fixed on the glue layer. The cover layer of the thermohardening resin can be formed easily and the production cost can be low.

This application is based on Japanese Application 05-210012 filed Aug. 25, 1993, incorporated herein in its entirety by reference.

Obviously, numerous modifications and variations of the present invention are possible in optical wave of the above teachings. It is therefore to be understood that, within the scope of the appended claims, the invention may be practiced otherwise than as specifically described herein.

What is claimed as new and desired to be secured by Letters Patent of the United States is:

1. An opto-electric device comprising:

a substrate;

a waveguide capable of guiding and transmitting an optical wave which comprises a core layer and at least one clad layer formed on said substrate; and a cover layer having a high optical wave absorption ratio, and which is formed on said waveguide either partially or entirely, wherein said cover layer comprises a high molecular weight compound and a dye, wherein said high molecular weight compound is a polymethyl methacrylate and said dye is an azo dye.

2. The device of claim 1, wherein the refractive index of the cover layer is almost or exactly same as that of the clad layer.

3. The device of claim 1, wherein the high molecular weight compound contains minute particles having a of high optical wave absorption ratio.

4. The device of claim 3, wherein the minute particles are carbon black.

5. The device of claim 1, wherein the high molecular compound has a micro-structure.

6. The device of claim 5, wherein the micro-structure comprises hollow voids.

7. The device of claim 1, further comprising a glue layer formed between the cover layer and said at least one clad layer.

* * * * *